(12) United States Patent
Kuehner et al.

(10) Patent No.: US 11,242,081 B1
(45) Date of Patent: Feb. 8, 2022

(54) STEERING WHEELS HAVING AN ADJUSTABLE DIAMETER BASED ON DRIVING BEHAVIOR (71) Applicant: Toyota Research Institute, Inc., Los Altos, CA (US)

(72) Inventors: Manuel Ludwig Kuehner, Mountain View, CA (US); Jaime Camhi, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/951,218

(22) Filed: Nov. 18, 2020

(51) Int. Cl.
*B62D 1/06* (2006.01)

(52) U.S. Cl.
CPC ..................... *B62D 1/06* (2013.01)

(58) Field of Classification Search
CPC ..................... B62D 1/06; B62D 1/04
See application file for complete search history.

(56) References Cited

U.S. PATENT DOCUMENTS

| 5,327,799 | A  | * | 7/1994 | Lin | B62D 1/06 |
| | | | | | 74/558 |
| 8,564,424 | B2 | | 10/2013 | Evarts et al. | |
| 8,757,658 | B2 | | 6/2014 | Feinstein | |
| 8,775,018 | B2 | | 7/2014 | Uenuma | |
| 8,881,347 | B2 | * | 11/2014 | Feinstein | B25F 5/006 |
| | | | | | 16/431 |
| 10,459,475 | B2 | * | 10/2019 | Gandhi | G05G 1/06 |
| 2007/0244641 | A1 | | 10/2007 | Altan et al. | |
| 2008/0163720 | A1 | | 7/2008 | Markfort | |
| 2010/0282018 | A1 | * | 11/2010 | Bazinski | B62D 1/06 |
| | | | | | 74/558 |
| 2015/0032334 | A1 | * | 1/2015 | Jang | B60W 10/20 |
| | | | | | 701/42 |

(Continued)

FOREIGN PATENT DOCUMENTS

| KR | 100527755 B1 | 11/2005 |
| KR | 20170135296 A | 12/2017 |

OTHER PUBLICATIONS

Zheng Wang, Satoshi Suga, Edric John Cruz Nacpil, Zhanhong Yan, and Kimihiko Nakano, Adaptive Driver-Automation Shared Steering Control Via Forearm Surface Electromyography Measurement, accessed Sep. 2020, 8 pages.

(Continued)

*Primary Examiner* — Richard W Ridley
*Assistant Examiner* — Brian J McGovern
(74) *Attorney, Agent, or Firm* — Dinsmore & Shohl LLP (57) ABSTRACT

A vehicle system includes one or more sensors, a steering wheel including a rim having a diameter, the steering wheel including an adjusting mechanism for adjusting the diameter of at least a portion of the rim, and a controller configured to determine whether a deviation factor between a target path and an actual path based on the one or more sensors exceeds a threshold deviation, send to the adjusting mechanism an instruction for adjusting the rim of the steering wheel to a first state in response to determining that the deviation factor exceeds the threshold deviation, and send to the adjusting mechanism an instruction for adjusting the rim of the steering wheel to a second state in response to determining that the deviation factor does not exceed the threshold deviation.

20 Claims, 7 Drawing Sheets

(56) References Cited

U.S. PATENT DOCUMENTS

| | | | |
|---|---|---|---|
| 2016/0159370 A1* | 6/2016 | Muramatsu | B60W 50/14 701/1 |
| 2016/0159396 A1* | 6/2016 | Watanabe | B62D 1/04 701/36 |
| 2016/0194022 A1* | 7/2016 | Williams | B62D 1/06 74/558 |
| 2016/0313733 A1 | 10/2016 | Bellem et al. | |
| 2017/0316684 A1* | 11/2017 | Jammoussi | G08G 1/096775 |
| 2020/0101985 A1* | 4/2020 | Ahmed | B60W 50/10 |
| 2020/0207367 A1* | 7/2020 | Adireddy | G08G 1/0965 |
| 2020/0372263 A1* | 11/2020 | Song | G05D 1/0278 |

OTHER PUBLICATIONS

Philipp Kerschbaum, Lutz Lorenz, and Klaus Bengler, A Transforming Steering Wheel for Highly Automated Cars, 2015 IEEE Intelligent Vehicles Symposium (IV), Jun. 28-Jul. 1, 2015, 6 pages.

* cited by examiner

STEERING WHEELS HAVING AN ADJUSTABLE DIAMETER BASED ON DRIVING BEHAVIOR

TECHNICAL FIELD

The present specification generally relates to steering wheels and systems for adjusting a diameter of a steering wheel and, more specifically, steering wheels and systems for adjusting a diameter of a steering wheel to provide positive reinforcement to or intervene the control of a driver, and/or notify the driver of a particular driving behavior.

BACKGROUND

Vehicles may be equipped with various driver assist devices to ensure that a vehicle maintains a driving path along a particular route. Such driver assist devices may include devices for increasing torque to a steering wheel to guide the vehicle such as, for example, away from another vehicle or toward a center of a driving lane. However, it may be distracting to the driver of the vehicle to feel the steering wheel being pulled in a direction against the will of the driver. Further, this may interfere with a driver's intended driving routine such as, for example, when the driver intends to change lanes and the driver assist device applies resistance in an opposite direction. Additional driver assist devices may include visual and/or audible alerts to notify the driver that the vehicle is not following a particular route. However, this may require the driver to take his or her eyes off the road to identify what information the alert is attempting to convey, which increases the risk of an accident.

Accordingly, a need exists for improved systems for notifying a driver of a correct or incorrect driving behavior such as by providing tactile feedback on the steering wheel itself to communicate such information to a driver of the vehicle without the driver being distracted by automated driving corrections or requiring the driver to take his or her eyes off the road.

SUMMARY

In one embodiment, a vehicle system includes one or more sensors, a steering wheel including a rim having a diameter, the steering wheel including an adjusting mechanism for adjusting the diameter of at least a portion of the rim, and a controller. The controller is configured to determine whether a deviation factor between a target path and an actual path based on the one or more sensors exceeds a threshold deviation, send to the adjusting mechanism an instruction for adjusting the rim of the steering wheel to a first state in response to determining that the deviation factor exceeds the threshold deviation, and send to the adjusting mechanism an instruction for adjusting the rim of the steering wheel to a second state in response to determining that the deviation factor does not exceed the threshold deviation.

In another embodiment, a vehicle system includes a steering wheel and a controller. The steering wheel includes a rim having a diameter and an adjusting mechanism for adjusting the diameter of at least a portion of the rim. The controller is configured to send to the adjusting mechanism an instruction for adjusting the rim of the steering wheel to a first state, and send to the adjusting mechanism an instruction for adjusting the rim of the steering wheel to a second state.

In yet another embodiment, a method includes determining whether a difference between a target driving path and an actual driving path of a vehicle during a driving segment exceeds a threshold deviation, actuating an adjusting mechanism of a steering wheel of the vehicle to position the steering wheel in a first state in response to determining that the deviation factor exceeds a threshold deviation, thereby adjusting a diameter of at least a portion of the steering wheel to a first diameter, and actuating the adjusting mechanism of the steering wheel of the vehicle to position the steering wheel in a second state in response to determining that the deviation factor does not exceed the threshold deviation, thereby adjusting a diameter of at least a portion of the steering wheel to a second diameter.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to steering wheels, vehicle systems, and methods for operating steering wheels for communicating a correct or incorrect driving behavior to a driver by increasing or decreasing a diameter of the steering wheel itself. The vehicle systems includes one or more sensors, a steering wheel, and a controller configured to adjust a diameter of a rim of the steering wheel based on a deviation factor between a target path and an actual path of the vehicle. As such, a driver holding the steering wheel may receive immediate tactile feedback on the steering wheel indicating that the driver is either correctly steering the vehicle or incorrectly steering the vehicle and that some action should be taken to correct the driving direction. In addition, by increasing or decreasing the diameter of the steering wheel, a degree of friction within the grip of the driver may be adjusted, thereby increasing or decreasing a driver's control of the steering wheel.

Various embodiments of the vehicle systems, steering wheels, and methods of operation are described in more detail herein. Whenever possible, the same reference numerals will be used throughout the drawings to refer to the same or like parts.

Figure 1:
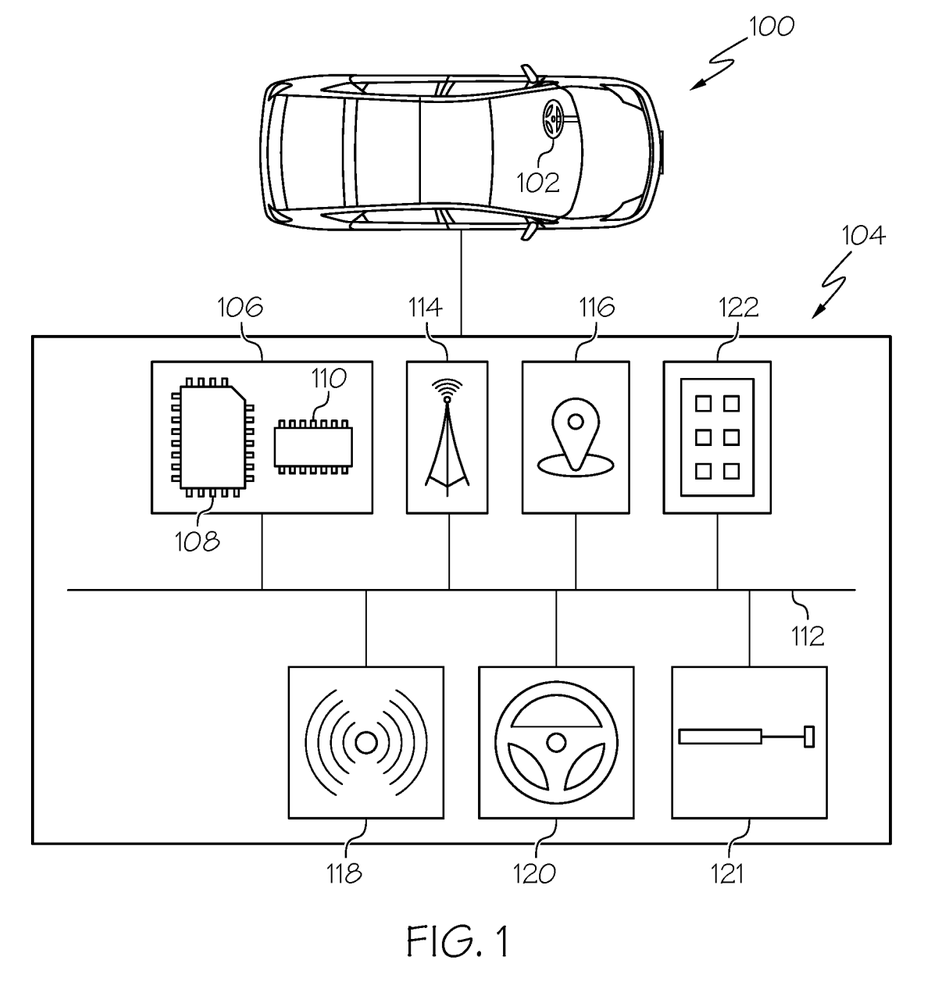
FIG. 1 schematically depicts a vehicle including a steering wheel and a vehicle system according to one or more embodiments shown and described herein.

Referring now to FIG. 1, a vehicle 100 is illustrated according to one or more embodiments described herein. The vehicle 100 may be an automobile or any other passenger or non-passenger vehicle such as, for example, a terrestrial, aquatic, and/or airborne vehicle including, but not limited, a bus, a scooter, a drone, and a bicycle. In some embodiments, the vehicle 100 may be an autonomous vehicle that navigates its environment with limited human input or without human input.

The vehicle 100 may generally include a steering wheel 102 for controlling a driving direction of the vehicle 100, and a vehicle system 104 for controlling adjustment of a diameter of the steering wheel 102 based on environment data received from one or more components of the vehicle system 104. As used herein, the term "diameter" refers to a cross-sectional diameter taken along line 3-3 of FIG. 2 and shown in FIGS. 3A-3C. Thus, the diameter refers to the diameter of a portion of the steering wheel 102 that a driver grips, not a diameter extending between opposite sides of the entire steering wheel 102. It should be appreciated that by adjusting the diameter of the steering wheel 102, a driver of the vehicle 100 gripping the steering wheel 102 receives immediate tactile feedback as to whether a correct driving operation or an incorrect driving operation is being performed based on an associated increase or decrease in the diameter of the steering wheel 102. In addition to receiving immediate tactile feedback, an increase of the diameter of the steering wheel 102 increases friction of the steering wheel 102 within the grip of the driver, thereby increasing the driver's control of the steering wheel 102. Alternatively, a decrease of the diameter of the steering wheel 102 decreases friction of the steering wheel 102 within the grip of the driver, thereby decreasing the driver's control of the steering wheel 102. As discussed in more detail herein, when friction is decreased, the steering wheel 102 may be automatically rotated toward a correct direction with reduced resistance by the driver. As used herein, a correct driving operation and an incorrect driving operation refers to the vehicle 100 following a target path determined by the vehicle system 104. As such, the steering wheel 102 is configured to notify the driver of the vehicle 100 as to whether the turning direction of the vehicle 100 should be maintained or if a correction, manually or automatic, is required.

As noted above, the vehicle 100 may be capable of automatically adjusting a steering direction of the steering wheel 102. In embodiments, the steering wheel 102 may include an actuator 121 that provides a torque control (e.g., rotation of the steering wheel 102). In a non-limiting example, in instances in which the driver rotates the steering wheel 102 in an incorrect direction, the actuator 121 may perform an "intervening" operation to rotate the steering wheel 102 in the opposite, correct direction. As described in more detail herein, a decrease in the diameter of the steering wheel 102 during rotation of the steering wheel 102 in the incorrect direction by the actuator 121 may result in an increased likelihood of the torque in the opposite, correct direction being accepted by the driver. In another non-limiting example, in instances in which the driver rotates the steering wheel 102 in a correct direction, but not enough, the actuator 121 may perform an "augment" operation to apply additional torque to rotate the steering wheel 102 further in the correct direction. As described in more detail herein, an increase in the diameter of the steering wheel 102 during rotation of the steering wheel 102 in the correct direction may result in an increased likelihood of the torque in the correct direction being accepted by the driver.

As a non-limiting example, an increase in the diameter of the steering wheel 102 may indicate that the driver is performing a correct driving operation. Similarly, a decrease in the diameter of the steering wheel 102 indicate that the driver is performing an incorrect driving operation and correction is required to steer the vehicle 100 along the target path. Alternatively, as another non-limiting example, an increase in the diameter of the steering wheel 102 may indicate that the driver is performing an incorrect driving operation and correction is required to steer the vehicle 100 along the target path. Similarly, a decrease in the diameter of the steering wheel 102 may indicate that the driver is performing a correct driving operation. As discussed herein, operating parameters, such as in what instances the diameter of the steering wheel 102 will increase or decrease may be selected by a driver of the vehicle 100.

Referring still to FIG. 1, the vehicle system 104 of the vehicle 100 is shown including a controller 106 including one or more processors 108 and one or more memory modules 110. Each of the one or more processors 108 may be any device capable of executing machine readable and executable instructions. Accordingly, each of the one or more processors 108 may be a controller, an integrated circuit, a microchip, a computer, or any other computing device. The one or more processors 108 are coupled to a communication path 112 that provides signal interconnectivity between various modules of the vehicle system 104. Accordingly, the communication path 112 may communicatively couple any number of processors 108 with one another, and allow the modules coupled to the communication path 112 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 112 may be formed from any medium that is capable of transmitting a signal such as, for example, conductive wires, conductive traces, optical waveguides, or the like. In some embodiments, the communication path 112 may facilitate the transmission of wireless signals, such as WiFi, Bluetooth®, Near Field Communication (NFC) and the like. Moreover, the communication path 112 may be formed from a combination of mediums capable of transmitting signals. In one embodiment, the communication path 112 comprises a combination of conductive traces, conductive wires, connectors, and buses that cooperate to permit the transmission of electrical data signals to components such as processors, memories, sensors, input devices, output devices, and communication devices. Accordingly, the communication path 112 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the vehicle system 104 includes one or more memory modules 110 coupled to the communication path 112. The one or more memory modules 110 may comprise RAM, ROM, flash memories, hard drives, or any device capable of storing machine readable and executable instructions such that the machine readable and executable instructions can be accessed by the one or more processors 108. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 110. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, in embodiments, the vehicle system 104 includes network interface hardware 114. The network interface hardware 114 can be communicatively coupled to the communication path 112 and can be any device capable of receiving and transmitting data via a network. Accordingly, the network interface hardware 114 can include a communication transceiver for sending and/or receiving any wired or wireless communication. For example, the network interface hardware 114 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 114 includes hardware configured to operate in accordance with the Bluetooth® wireless communication protocol. For example, the network interface hardware 114 of the vehicle system 104 may receive environment data including navigation instructions and road data such as, for example, lane data, road curvature data, traffic data, and the like. As described herein, this environment data may be used to determine a target path along which the vehicle 100 should be driving.

In embodiments, the vehicle system 104 includes a location sensor 116 communicatively coupled to the other components of the vehicle system 104 via the communication path 112. The location sensor 116 may be, for example, a GPS module, configured to collect location data indicating a location of the vehicle 100. The location sensor 116 is configured to determine an actual path of the vehicle 100 while driving. Additionally, location data collected by the location sensor 116 is used to determine a deviation factor, i.e., how much the actual path of the vehicle 100 deviates from the target path.

Referring still to FIG. 1, the vehicle system 104 may include one or more sensors 118 such as, for example, a camera. In some embodiments, the one or more sensors 118 may include one or more optical components, such as a mirror, fish-eye lens, or any other type of lens. In some embodiments, the sensors 118 are configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors 118 described herein may include one or more LIDAR sensors, radar sensors, sonar sensors, or other types of sensors and that such data could be integrated into or supplement the data collection as described herein. Specifically, the sensors 118 of the vehicle system 104 collect additional environment data such as, for example, lane lines, nearby vehicles or obstacles, and the like. The collected environment data may also be used to determine a target path of the vehicle 100 to avoid departing from a specific lane or driving too close to other vehicles or objects.

The vehicle system 104 includes an adjusting mechanism 120 for adjusting a diameter of the steering wheel 102 based on the environment data and location data of the vehicle 100 received from the other components of the vehicle system 104. The adjusting mechanism 120 is communicatively coupled to the other components of the vehicle system 104 via the communication path 112. Specifically, the adjusting mechanism 120 receives information from at least the network interface hardware 114, the location sensor 116, and the one or more sensors 118, to determine whether the diameter of the steering wheel 102 should be adjusted by actuating the adjusting mechanism 120 corresponding to a deviation factor between the actual path the vehicle 100 is traveling and the target path. In embodiments, the adjusting mechanism 120 may be configured to decrease a diameter of the steering wheel 102 when a deviation factor between the actual path and the target path exceeds a threshold deviation. Similarly, the adjusting mechanism 120 may be configured to increase the diameter of the steering wheel 102 when the deviation factor does not exceed the threshold deviation. Alternatively, in embodiments, the adjusting mechanism 120 may be configured to increase a diameter of the steering wheel 102 when a deviation factor between the actual path and the target path exceeds a threshold deviation. Similarly, the adjusting mechanism 120 may be configured to decrease the diameter of the steering wheel 102 when the deviation factor does not exceed the threshold deviation. Specific embodiments of the adjusting mechanism 120 and operation thereof are discussed in more detail herein.

In embodiments, the vehicle system 104 includes the actuator 121, discussed herein, communicatively coupled to the other components of the vehicle system 104 via the communication path 112. The actuator 121 may be provided in a steering column extending from the steering wheel 102 to apply a torque in either a clockwise direction or a counterclockwise direction to the steering wheel 102 in response to an instruction from one or more of the components of the vehicle system 104, as discussed herein.

In embodiments, the vehicle system 104 includes a control device 122 communicatively coupled to the other components of the vehicle system 104 via the communication path 112. The control device 122 includes one or more controls for selecting or adjusting operating parameters of the adjusting mechanism 120. The one or more controls may be any suitable user operating device such as, for example, buttons or the like. In some embodiments, the control device 122 includes a user interface, such as a touch screen user interface, for selecting or adjusting the operating parameters of the adjusting mechanism 120. For example, the control device 122 may be operated to select in what situations the diameter of the steering wheel 102 will be increased, in what situations the diameter of the steering wheel 102 will be decreased, to select a threshold deviation for determining a correct driving condition and an incorrect driving condition, to select a pattern for actuating the adjusting mechanism 120 to identify how an incorrect driving condition should be corrected to match a correct driving condition, for example, pulse actuation, and to select whether the diameter of the entire steering wheel 102 will be increased or decreased or only a portion thereof, for example, only adjusting those portions of the steering wheel 102 being gripped by the driver. It should be appreciated that selections of the above operating parameters may be assigned to a particular driver profile such that actuation of the adjusting mechanism 120 is specifically tailored to a particular driver of the vehicle 100. As such, a driver profile may be set as a default upon operating the vehicle 100 or selected from a plurality of driver profiles using the control device 122.

Figure 2:
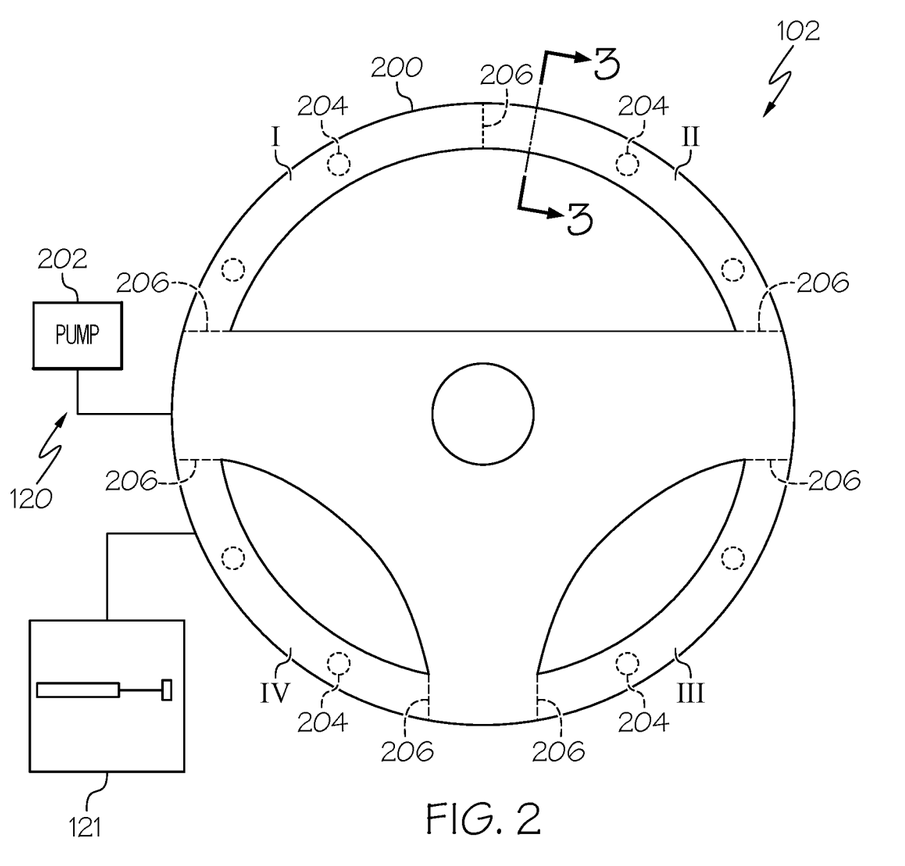
FIG. 2 schematically depicts a front view of the steering wheel of the vehicle according to one or more embodiments shown and described herein.

Referring now to FIG. 2, an illustrative embodiment of the steering wheel 102 of the vehicle 100 is illustrated. It should be appreciated that the steering wheel 102 is only one example of a steering wheel that may be utilized having an adjustable diameter. As such, the present disclosure is not limited to the steering wheels illustrated and discussed herein.

The steering wheel 102 includes a rim 200, which the driver of the vehicle 100 grips to facilitate turning of the steering wheel 102 and controlling a driving direction of the vehicle 100 along an actual path. The steering wheel 102 includes the adjusting mechanism 120 for adjusting a diameter of the rim 200. In embodiments, the adjusting mechanism 120 includes a pump 202, such as a pneumatic pump, a hydraulic pump, or the like, in fluid communication with the rim 200 to deliver a fluid such as, for example, water, air, or the like, into the rim 200 of the steering wheel 102, upon actuation of the adjusting mechanism 120 to adjust the diameter of the rim 200. In other embodiments, the adjusting mechanism 120 includes mechanical components provided on the rim 200 or forming at least a portion thereof, and operated by a motor, actuator, or the like, to actuate the adjusting mechanism 120 and adjust the diameter of the rim 200.

Referring still to FIG. 2, the steering wheel 102 may include one or more pressure sensors 204 to detect an amount of force applied onto the steering wheel 102 by a driver when gripping the steering wheel 102. The pressure sensors 204 may be located on or within the rim 200 and are communicatively coupled to the vehicle system 104. Further, in embodiments, the rim 200 may be partitioned into a plurality of sections I, II, III, IV separated by dividing walls 206 such that each section I-IV is not in direct fluid communication with any other section I-IV of the rim 200. The pump 202 of the adjusting mechanism 120, when provided, may be in fluid communication with each of the sections I-IV and configured to selectively deliver fluid to only certain sections I-IV of the rim 200. For example, the pump 202 may be configured to deliver fluid to only sections including pressure sensors 204 detecting a pressure in excess of a threshold pressure, which indicates that the driver is gripping the steering wheel 102 at that particular section. Thus, in embodiments, only the section or sections I-IV of the steering wheel 102 currently being gripped by the driver are adjusted by the adjusting mechanism 120. As a non-limiting example, if only the pressure sensors 204 positioned in section I detect a pressure being applied in excess of the threshold pressure, such as when the driver is driving with one hand, only section I of the rim 200 will be adjusted. As another non-limiting example, if the pressure sensors 204 positioned in section I and section II both detect a pressure being applied in excess of the threshold pressure, such as when the driver is driving with both hands, only section I and section II of the rim 200 will be adjusted.

Figure 3A:
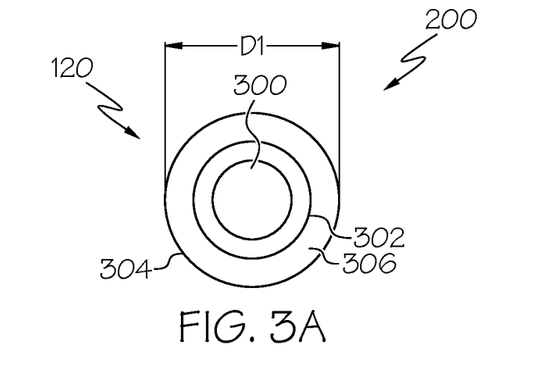
FIG. 3A schematically depicts a cross-sectional view of an embodiment of a rim of the steering wheel in a first state taken along line 3-3 of FIG. 2 including an adjusting mechanism according to one or more embodiments shown and described herein.
Figure 3B:
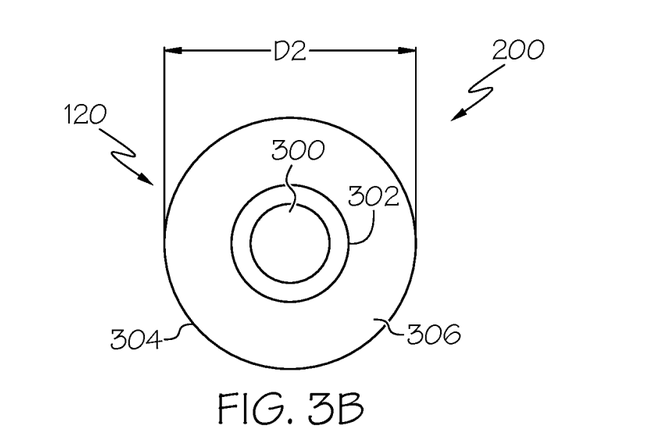
FIG. 3B schematically depicts a cross-sectional view of the rim of FIG. 3A in a default state according to one or more embodiments shown and described herein.
Figure 3C:
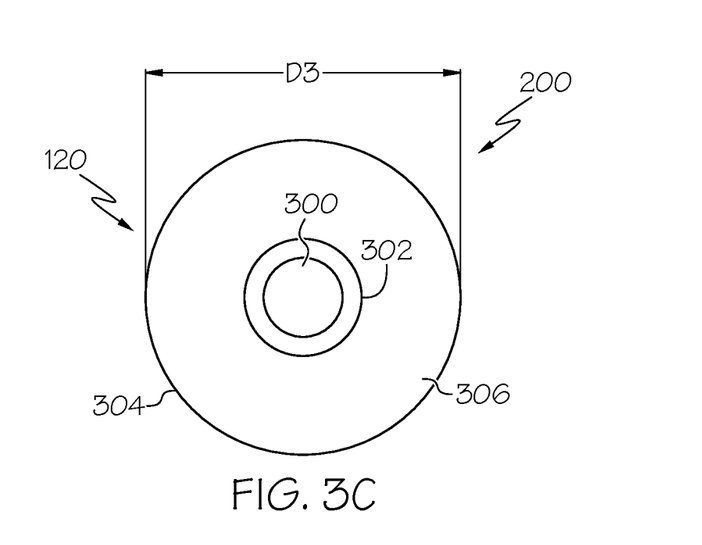
FIG. 3C schematically depicts a cross-sectional view of the rim of FIG. 3A in a second state according to one or more embodiments shown and described herein.

As shown in FIGS. 3A-3C, a cross-section of an illustrative embodiment of the rim 200 including the adjusting mechanism 120 is illustrated. In embodiments, the rim 200 includes a core 300, an inner sleeve 302 surrounding the core 300, and an outer sleeve 304 surrounding the inner sleeve 302. A bladder 306 is formed between the inner sleeve 302 and the outer sleeve 304 and configured to receive a fluid from the pump 202. The outer sleeve 304 may be formed from an elastomeric material. As fluid is delivered into the bladder 306 by the pump 202, the outer sleeve 304 expands, thereby inflating the bladder 306, which surrounds the core 300 of the rim 200, and increasing the diameter of the rim 200. Similarly, as fluid is drawn out of the bladder 306 by the pump 202, the outer sleeve 304 returns to its original state and the diameter of the rim 200 is decreased. As used herein, the rim 200 being adjusted or positioned into a first state may refer to the rim 200 having a completely decreased or smallest diameter, i.e., no fluid is in the rim 200, the rim 200 being adjusted or positioned into a second state may refer to the rim 200 having a completely increased or greatest diameter, i.e., a maximum amount of fluid is in the rim 200, and the rim 200 being in a default state may refer to the rim 200 having a partially increased diameter substantially half way between the first state and the second state.

With more particularity, the rim 200 illustrated in FIG. 3A is shown in a first state in which the rim 200 has a first diameter D1. In the first state, the bladder 306 may receive no fluid from the pump 202 or a minimal amount of fluid to provide the rim 200 with the smallest possible diameter. As shown in FIG. 3B, the rim 200 is illustrated in a default state in which the rim 200 has a second diameter D2 larger than the first diameter D1. Thus, the pump 202 is operated to deliver fluid into the bladder 306 between the inner sleeve 302 and the outer sleeve 304, thereby causing the outer sleeve 304 to expand and increasing the diameter of the rim 200. As shown in FIG. 3C, the rim 200 is illustrated in a second state in which the rim 200 has a third diameter D3 larger than the first diameter D1 and the second diameter D2. As such, the pump 202 is operated to deliver an additional amount of fluid into the bladder 306, thereby causing the outer sleeve 304 to further expand and increase the diameter of the rim 200.

It should be appreciated that by increasing the diameter of the rim 200 from the first state or the default state to the second state, a driver's grip will become tighter against the rim 200 as the diameter of the rim 200 increases within the hands of the driver. Similarly, it should be appreciated that by decreasing the diameter of the rim 200 from the second state or the default state to the first state, a driver's grip will become looser against the rim 200 as the diameter of the rim 200 decreases within the hands of the driver. This tactile feedback may indicate to the driver whether a correct or incorrect driving operation is being performed.

Figure 4A:
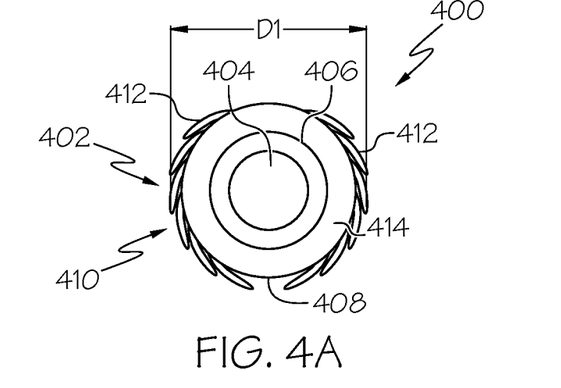
FIG. 4A schematically depicts a cross-sectional view of an embodiment of a rim in a first state including an adjustment mechanism according to one or more embodiments shown and described herein.
Figure 4B:
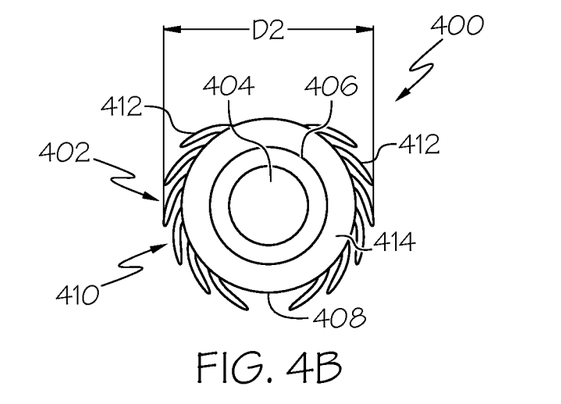
FIG. 4B schematically depicts a cross-sectional view of the rim of FIG. 4A in a default state according to one or more embodiments shown and described herein.
Figure 4C:
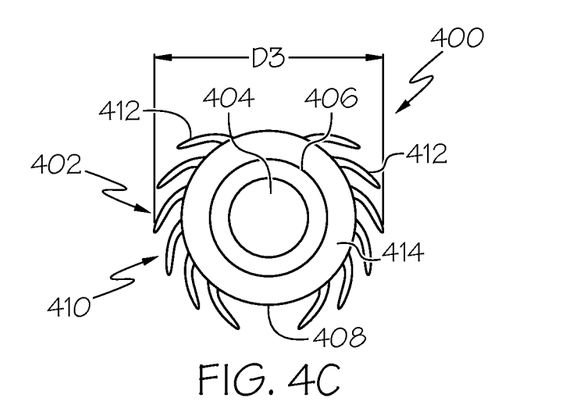
FIG. 4C schematically depicts a cross-sectional view of the rim of FIG. 4A in a second state according to one or more embodiments shown and described herein.

Referring now to FIGS. 4A-4C, an illustrative embodiment of a rim 400 of the steering wheel 102 including an adjusting mechanism 402 is illustrated. In embodiments, the rim 400 includes a core 404, an inner sleeve 406 surrounding the core 404, and an outer sleeve 408 surrounding the inner sleeve 406, similar to the rim 200 discussed herein. Further, the adjusting mechanism 402 of the rim 400 includes a shell 410 provided on the outer sleeve 408. The shell 410 may include a plurality of scales 412 that are actuatable to flex outwardly and adjust a diameter of the rim 400, as opposed to the expandable outer sleeve 304 and the bladder 306 of the rim 200 described herein. The shell 410 may be actuatable by a motor or, in some embodiments, the scales 412 of the shell 410 may be in fluid communication with the pump 202, shown in FIG. 2, and inflatable when filled with fluid from the pump 202 to cause the scales 412 to flex outwardly. More specifically, the scales 412 may be in fluid communication with a channel 414 formed between the inner sleeve 406 and the outer sleeve 408 of the rim 400 to receive fluid delivered from the pump 202.

With more particularity, the rim 400 illustrated in FIG. 4A is shown in a first state in which the rim 400 has a first diameter D1. In the first state, the scales 412 may receive no fluid from the pump 202 or a minimal amount of fluid to provide the rim 400 with the smallest possible diameter. Alternatively, the scales 412 may not be actuated by a motor or the like such that the scales 412 rest against the outer sleeve 408 of the rim 400. As shown in FIG. 4B, the rim 400 is illustrated in a default state in which the rim 400 has a second diameter D2 larger than the first diameter D1. Thus, the pump 202 is operated to deliver fluid into the scales 412, thereby causing the scales 412 to flex radially outwardly from the core 404 of the rim 400 and increase the diameter of the rim 400. Alternatively, the scales 412 may be partially actuated by a motor or the like such that the scales 412 partially extend outwardly from the outer sleeve 408 of the rim 400. As shown in FIG. 4C, the rim 400 is illustrated in a second state in which the rim 400 has a third diameter D3 larger than the first diameter D1 and the second diameter D2. As such, the pump 202 is operated to deliver an additional amount of fluid into the scales 412, thereby causing the scales 412 to flex further away from the core 404 of the rim 400 and further increase the diameter of the rim 400. Alternatively, the scales 412 may be further actuated by a motor or the like such that the scales 412 extend further outwardly from the outer sleeve 408 of the rim 400.

Without limiting the scope of the present disclosure, it should be appreciated that the changes in diameter of the rims 200, 400 associated with the first state and the second state of the rims 200, 400 may be changed by the control device 122, as shown in FIG. 1. For example, when in the first state, the diameter of the rims 200, 400 may be increased rather than decreased. Similarly, when in the second state, the diameter of the rims 200, 400 may be decreased rather than increased. This allows for the driver of the vehicle 100 to select the specific type of feedback, i.e., changes in the diameter of the rims 200, 400, based on a driving behavior of the vehicle 100.

Figure 5A:
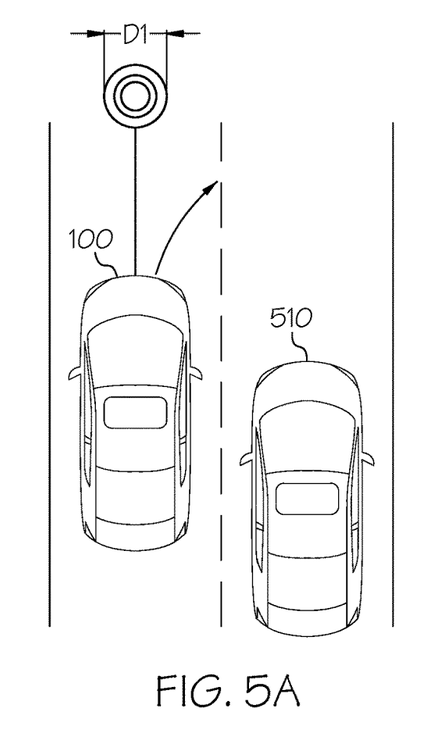
FIG. 5A schematically depicts a plan view of the vehicle performing a lane change operation with another vehicle in the adjacent lane according to one or more embodiments shown and described herein.

Referring now to FIG. 5A, the vehicle 100 is switching lanes by turning a steering wheel clockwise. In this example, another vehicle 510 is in a right lane, and the action of the driver switching to the right lane may not be desirable. In this case, the vehicle 100 may detect the vehicle 510 in the right lane using its one or more sensors 118, and the diameter of the rim 200 is decreased to the first diameter D1, which is less than the second diameter D2. Further, in some embodiments, the actuator 121 of the steering wheel 102, discussed herein, may be operated to perform an intervening operation and apply torque in the opposite, counterclockwise direction against the turning operation of the driver. In this embodiment, reducing the diameter of the rim 200 to the first diameter D1 loosens contact with the hands of the driver, which permits the steering wheel 102 to be operated (e.g., turning counterclockwise by the actuator 121) against the driver's intention. Reducing the diameter of the rim 200 may allow the vehicle 100 to easily intervene the driver's control without harming or distracting the driver.

Figure 5B:
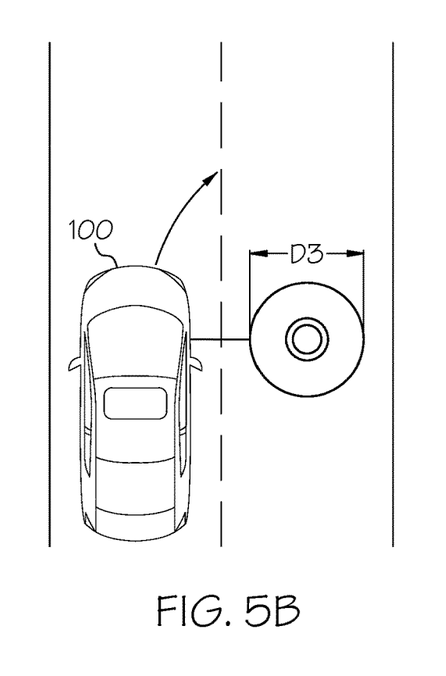
FIG. 5B schematically depicts a plan view of the vehicle performing a lane change operation with no vehicle in the adjacent lane according to one or more embodiments shown and described herein.

Referring now to FIG. 5B, the vehicle 100 is switching lanes by turning a steering wheel clockwise. In this example, no vehicle is in the right lane, and thus the driver of the vehicle 100 is making a proper action. In this case, the vehicle 100 may detect no vehicle in the right lane using its one or more sensors 118, and the diameter of the rim 200 is increased to the third diameter D3. As a result, the friction between the rim 200 and the grip of the driver is increased, thereby increasing control of the rim 200 and torque by the driver. In this regard, the driver may feel a better experience when switching lanes. While FIGS. 5A and 5B illustrate an example of the vehicle 100 switching lanes, the features of increasing or decreasing the diameter of the steering wheel 200 may be applied where the driver makes a turn at an intersection, makes a U-turn, and the like.

Figure 5C:
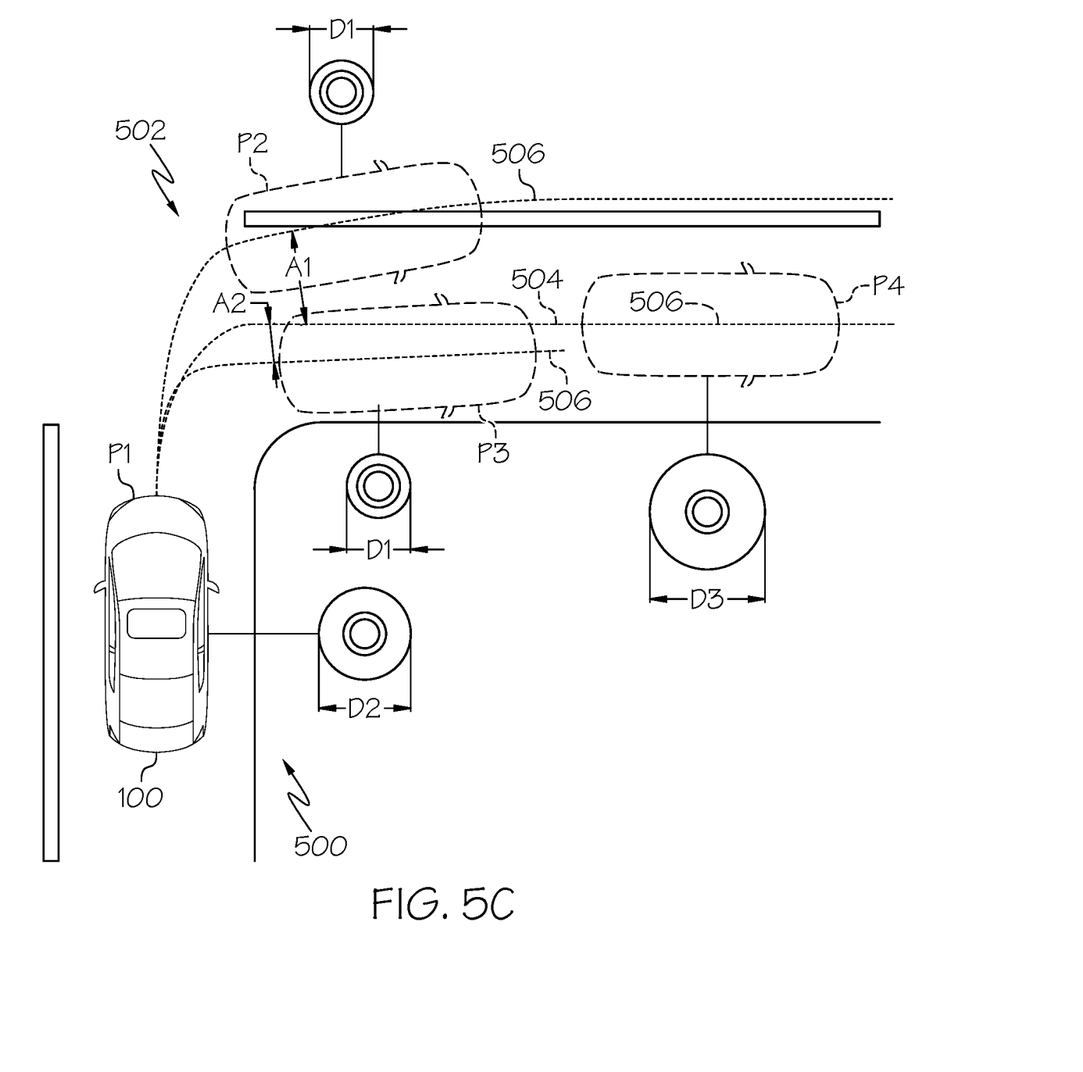
FIG. 5C schematically depicts a plan view of the vehicle driving on a roadway at various positions and a corresponding state of the rim of FIG. 2 at each position according to one or more embodiments shown and described herein.

Referring now to FIG. 5C, the vehicle 100 is illustrated driving on a roadway 500 and performing a turning operation. The roadway 500 includes a driving segment 502 including a turn. However, it should be appreciated that the present disclosure is not limited to the specific roadway disclosed herein including a turn. For example, the present disclosure may be equally applicable when changing lanes, avoiding obstacles, and the like. A target path 504 is illustrated indicating a correct position of the vehicle 100 while traveling along the driving segment 502 and performing the turning operation. As discussed herein, the target path 504 may be determined by the environment data collected by the network interface hardware 114, the location sensor 116, and the one or more sensors 118 of the vehicle system 104 shown in FIG. 1. In addition, various alternative positions of the vehicle 100 are illustrated in phantom traveling along the driving segment 502. Corresponding states of the rim 200 of the steering wheel 102, with reference to the rim 200 illustrated in FIGS. 3A-3C, are illustrated for each position of the vehicle 100 present when driving along the driving segment 502.

As shown in FIG. 5C, a first position P1 of the vehicle 100 is illustrated on the roadway 500 prior to the vehicle 100 entering the driving segment 502 and initiating the turning operation. At the first position P1, the rim 200 of the vehicle 100 is depicted in the default state such that the diameter of the rim 200 is adjusted to the second diameter, between the first diameter and the third diameter. As the vehicle 100 continues along the roadway 500, enters the driving segment 502, and begins to perform the turning operation, as shown at a second position P2, an actual path 506 of the vehicle 100 deviates from the target path 504 by a deviation factor of A1. In an embodiment, the diameter of the rim 200 may be increased to the third diameter D3 to help the driver turn the steering wheel 102 clockwise further such that the vehicle 100 may follow the path 504. In addition, the actuator 121 of the steering wheel 102 may be operated to perform an augment operation and apply additional torque to the steering wheel 102 to direct the vehicle 100 toward the target path 504. Alternatively, in the embodiment illustrated, the rim 200 of the vehicle 100 is depicted in the first state such that the diameter of the rim 200 is adjusted to the first diameter D1, which is less than the second diameter D2. In this embodiment, reducing the diameter of the rim 200 to the first diameter D1 indicates that the vehicle 100 is in an incorrect position. Similarly, as the vehicle 100 enters the driving segment 502 and begins to perform the turning operation, as shown at a third position P3, the actual path 506 of the vehicle 100 deviates from the target path 504 by a deviation factor of A2. Thus, the rim 200 is also depicted in the first state such that the diameter of the rim 200 is adjusted to the first diameter D1 to indicate that the vehicle 100 is again in an incorrect position. In addition, the actuator 121 of the steering wheel 102 may perform an intervening operation to rotate the steering wheel 102 in an opposite direction toward the target path 504. As a result of the diameter of the rim 200 being adjusted to the first diameter D1, the friction between the grip of the driver and the rim 200 is reduced, thereby reducing the amount of control the driver has over the rim 200 if no adjustment to the strength of the driver's grip is made. As such, torque of the rim 200 by the driver may be reduced and/or automatic adjustments of the rim 200 by the actuator 121 of the steering wheel 102 may be made to adjust a driving direction of the vehicle 100.

In embodiments, the amount of adjustment of the rim 200 from the default state to the first state may be based on a degree or magnitude of the deviation factor. For example, although not shown, the diameter of the rim 200 when the vehicle 100 is in the second position may be smaller than the diameter of the rim 200 when the vehicle 100 is in the third position since the deviation factor A1 of the vehicle 100 in the second position P2 is greater than the deviation factor A2 of the vehicle 100 in the third position P3. Thus, it should be appreciated that increased adjustment of the rim 200 toward the first state when the vehicle 100 is in the second position P2 indicates that the vehicle 100 is further from the target path 504 than the vehicle 100 when in the third position P3.

Further, it should be appreciated that the rim 200 will be adjusted or positioned toward the second state to increase the diameter of the rim 200 toward the third diameter when the deviation factor does not exceed a threshold deviation, thereby indicating that the vehicle 100 is in the correct position and traveling along the target path 504. For example, as shown in FIG. 5C, the vehicle 100 is shown at a fourth position P4 and traveling along the target path 504. Thus, the rim 200 is adjusted from the default state to the second state such that the diameter of the rim 200 is increased to the third diameter D3. As a result, the friction between the rim 200 and the grip of the driver is increased, thereby increasing control of the rim 200 and torque by the driver. As discussed herein, it should be appreciated that the degree of adjustment of the rim 200 toward the second state may correspond to how closely the actual path 506 matches the target path 504, i.e., a degree of the deviation factor. Thus, for example, the diameter of the rim 200 when driving closer to the target path 504 may be larger than the diameter of the rim 200 when driving further from the target path 504.

Thus, it should be appreciated that the rim 200 being adjusted to the second state having the third diameter D3 indicates that the vehicle 100 is traveling along the target path 504 and in the correct position, while the rim 200 being adjusted to the first state having the first diameter D1 indicates that the vehicle 100 is deviating from the target path 504 and in an incorrect position. However, as discussed herein, the present disclosure is not limited to this specific manner of adjustment of the rim 200. For example, the diameter of the rim 200 when in the first state may be increased to indicate the vehicle 100 is driving in an incorrect position, and the diameter of the rim 200 when in the second state may be decreased to indicate that the vehicle 100 is in the correct position. Again, these driving parameters may be adjusted or selected by the driver using the control device 122 of the vehicle system 104, as shown in FIG. 1.

Figure 6:
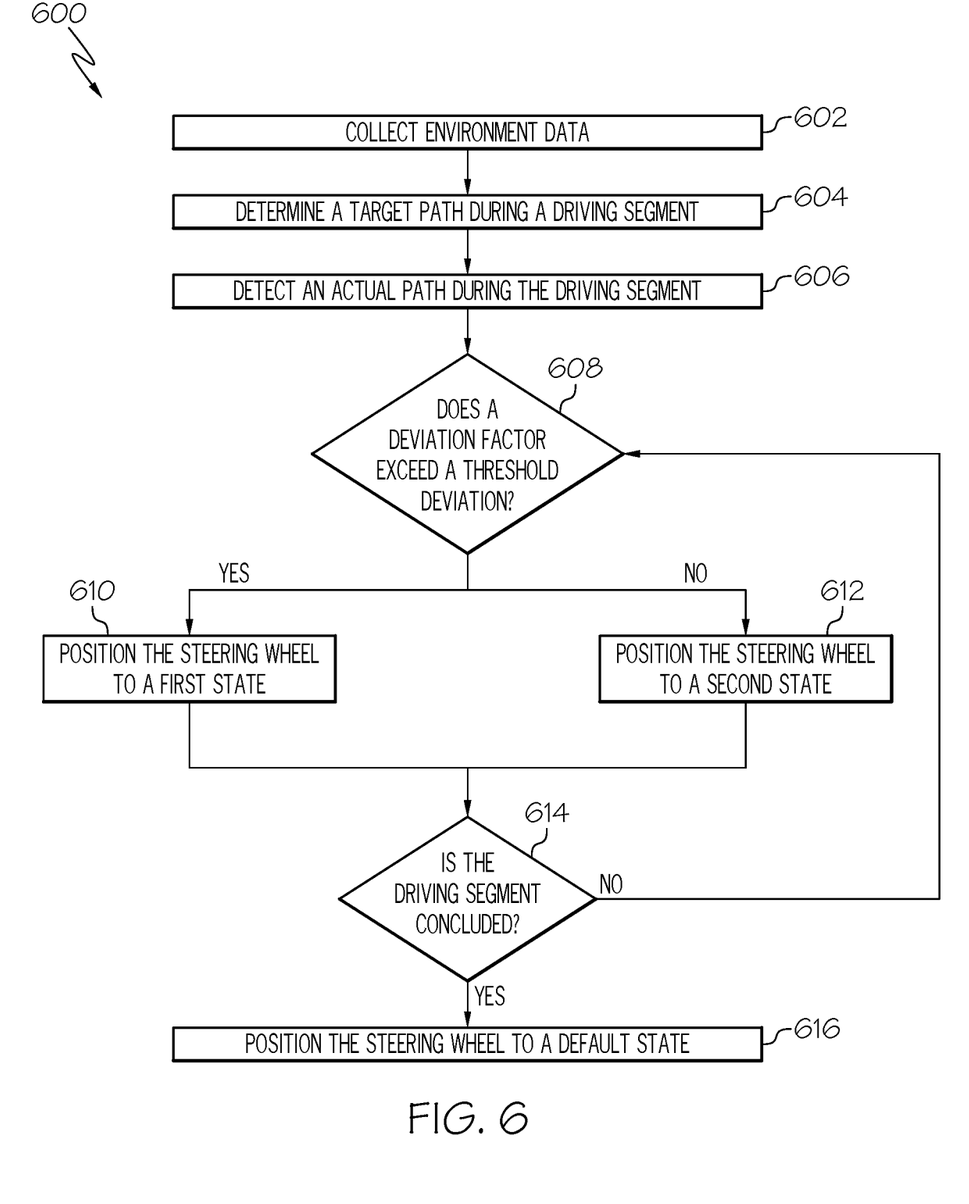
FIG. 6 schematically depicts a flowchart of a method for operating the steering wheel according to one or more embodiments shown and described herein.

Referring now to FIG. 6, with reference to FIGS. 1-3C, a method 600 of operation for the vehicle 100 and the rim 200 is described in more detail.

Initially, at step 602, the vehicle 100 system collects environment data such as, for example, navigation instructions, a position of the vehicle 100, other vehicles, vehicle obstacles, such as a pedestrian, lane lines, and the like. The environment data may be collected by the network interface hardware 114 receiving navigation instructions and road information, the location sensor 116 to determine a location of the vehicle 100, and the one or more sensors 118 to detect objects on a roadway relative to the vehicle 100. Based on the environment data collected in step 602, the vehicle system 104 determines a target path at step 604 during one or more driving segments of a roadway. For example, a particular driving segment may include a turn in the roadway and the target path may be a path extending through a middle of the lane of the driving segment. At step 606, the vehicle system 104 detects an actual path of the vehicle 100 based on the location sensor 116 and/or the one or more sensors 118.

At step 608, the vehicle system 104 determines whether a deviation factor between the target path and the actual path of the vehicle 100 exceeds a threshold deviation. As noted above, the threshold deviation may be set by the driver of the vehicle 100 by operating the control device 122. Thus, in instances in which the driver chooses to reduce the frequency of adjustments of the rim 200 of the steering wheel 102, the driver may increase the threshold deviation. In doing so, the vehicle system 104 may permit a larger range of deviation between the target path and the actual path before actuating the adjusting mechanism 120 and adjusting the diameter of the rim 200 of the steering wheel 102. Alternatively, the driver may reduce the threshold deviation such that the adjusting mechanism 120 actuates more frequently in response to the vehicle 100 deviating from the target path.

If the vehicle system 104 determines at step 608 that the deviation factor exceeds the threshold deviation, the method 600 proceeds to step 610 and the adjusting mechanism 120 actuates to adjust the rim 200 of the steering wheel 102 to the first state. In the embodiment depicted in FIG. 5 with the vehicle 100 shown in the second position P2 and the third position P3, the diameter of the rim 200 decreases from the second diameter D2 exhibited by the rim 200 when in the default state to the first diameter D1 exhibited by the rim 200 when in the first state. Further, as discussed herein, it is contemplated that the degree of adjustment from the default state to the first state may be based on the specific deviation factor. As such, a smaller deviation factor will result in smaller degree of adjustment toward the first state as compared to a degree of adjustment toward the first state when exhibiting a larger deviation factor.

Alternatively, if the vehicle system 104 determines at step 608 that the deviation factor does not exceed the threshold deviation, the method 600 proceeds to step 612 and the adjusting mechanism 120 is actuated to adjust the rim 200 of the steering wheel 102 to the second state. In the embodiment depicted in FIG. 5 with the vehicle 100 shown in the fourth position P4, the diameter of the rim 200 increases from the second diameter D2 exhibited by the rim 200 when in the default state to the third diameter D3 exhibited by the rim 200 when in the second state. Further, as discussed herein, it is contemplated that the degree of adjustment from the default state to the second state may be based on how close the actual path is to the target path.

In either instance, the method 600 proceeds to step 614 to determine whether the driving segment, for example, the turning operation, is complete. If it is not determined that the driving segment is complete at step 614, the method 600 returns to step 608 to continue to monitor the deviation factor while the vehicle 100 is driving along the driving segment. Thus, even when the rim 200 is initially adjusted to the second state to indicate that the deviation factor does not exceed the threshold deviation, i.e., the vehicle 100 is within range of the target path, the rim 200 may be adjusted toward the first state as the vehicle 100 begins to move away from the target path and the deviation factor begins to exceed the threshold deviation. Similarly, if the rim 200 is initially adjusted to the first state to indicate that the deviation factor is greater than the threshold deviation, i.e., the vehicle 100 is outside of range of the target path, the rim 200 may be adjusted toward the second state as the vehicle 100 moves within range the target path and the deviation factor becomes less than the threshold deviation. Alternatively, if it is determined at step 614 that the driving segment is concluded, for example, the vehicle 100 has completed the turning operation, the rim 200 is adjusted back to the initial default state at step 616 until the vehicle 100 approaches another driving segment.

As discussed herein, various operating parameters of the rim 200 may be controlled by the control device 122. For example, operating parameters may include adjusting of the rim 200 to the first state and the second state being oppositely configured, for example, increasing the diameter and decreasing the diameter, respectively, the length of time at which the rim 200 remains in the first state and the second state before returning to the default state, a pattern of actuation, for example, repeatedly actuating the adjusting mechanism 120 to adjust the diameter of the rim 200 between the default state and the first state or the second state rather than a constant actuation, and the like.

From the above, it is to be appreciated that defined herein are vehicle systems, steering wheels, and methods of operating a steering wheel to communicate to a driver of a vehicle whether the driver is correctly or incorrectly steering the vehicle. In situations in which the driver is incorrectly steering the vehicle, the driver may be made aware based on a change in the diameter of the steering wheel corresponding to an incorrect driving behavior.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system comprising:
one or more sensors;
a steering wheel including a rim having a diameter, the steering wheel including an adjusting mechanism for adjusting the diameter of at least a portion of the rim; and
a controller configured to:
determine whether a deviation factor between a target path and an actual path based on the one or more sensors exceeds a threshold deviation;
send to the adjusting mechanism an instruction for adjusting the rim of the steering wheel to a first state in response to determining that the deviation factor exceeds the threshold deviation; and
send to the adjusting mechanism an instruction for adjusting the rim of the steering wheel to a second state in response to determining that the deviation factor does not exceed the threshold deviation.

2. The vehicle system of claim 1, wherein the diameter of the rim when in the first state is less than the diameter of the rim when in the second state.

3. The vehicle system of claim 1, wherein the diameter of the rim when in the first state is greater than the diameter of the rim when in the second state.

4. The vehicle system of claim 1, further comprising an actuator to apply a torque to the steering wheel in response to determining that the deviation factor exceeds the threshold deviation.

5. The vehicle system of claim 4, wherein the adjusting mechanism is configured to adjust the diameter of the rim only at locations of the steering wheel at which the one or more pressure sensors detect a pressure in excess of a threshold pressure.

6. The vehicle system of claim 1, wherein the controller is configured to send a signal to the adjusting mechanism to adjust the diameter of the rim based on a degree of the deviation factor between the target path and the actual path.

7. The vehicle system of claim 1, wherein the controller is configured to send a signal to the adjusting mechanism for adjusting the rim of the steering wheel to a default state after a driving segment is completed.

8. The vehicle system of claim 7, wherein the diameter of the rim when in the default state is between the diameter of the rim when in the first state and the diameter of the rim when in the second state.

9. The vehicle system of claim 1, wherein the adjusting mechanism comprises a bladder positioned in the rim and a pump configured to inflate the bladder to adjust the diameter of the rim between the first state and the second state.

10. The vehicle system of claim 1, wherein the adjusting mechanism comprises a shell including a plurality of scales and a pump configured to adjust a position of the plurality of scales to adjust the diameter of the rim between the first state and the second state.

11. A vehicle system comprising:
a steering wheel comprising a rim having a diameter and an adjusting mechanism for adjusting the diameter of at least a portion of the rim; and
a controller configured to:
send to the adjusting mechanism an instruction for adjusting the rim of the steering wheel to a first state in response to determining that a deviation factor exceeds a threshold deviation; and send to the adjusting mechanism an instruction for adjusting the rim of the steering wheel to a second state in response to determining that the deviation factor does not exceed the threshold deviation.

12. The vehicle system of claim 11, wherein the diameter of the rim when in the first state is less than the diameter of the rim when in the second state.

13. The vehicle system of claim 11, wherein the diameter of the rim when in the first state is greater than the diameter of the rim when in the second state.

14. The vehicle system of claim 11, wherein the steering wheel further comprises one or more pressure sensors configured to detect a pressure against the rim.

15. The vehicle system of claim 14, wherein the adjusting mechanism is configured to adjust the diameter of the rim only at locations of the steering wheel at which the one or more pressure sensors detect a pressure in excess of a threshold pressure.

16. The vehicle system of claim 11, wherein the adjusting mechanism comprises a bladder positioned in the rim and a pump configured to inflate the bladder to adjust the diameter of the rim between the first state and the second state.

17. The vehicle system of claim 11, wherein the adjusting mechanism comprises a shell including a plurality of scales and a pump configured to adjust a position of the plurality of scales to adjust the diameter of the rim between the first state and the second state.

18. A method comprising:
determining whether a deviation factor between a target driving path and an actual driving path of a vehicle during a driving segment exceeds a threshold deviation;
actuating an adjusting mechanism of a steering wheel of the vehicle to position the steering wheel in a first state in response to determining that the deviation factor exceeds the threshold deviation, thereby adjusting the diameter of at least the portion of the steering wheel to a first diameter; and
actuating the adjusting mechanism of the steering wheel of the vehicle to position the steering wheel in a second state in response to determining that the deviation factor does not exceed the threshold deviation, thereby adjusting a diameter of at least a portion of the steering wheel to a second diameter.

19. The method of claim 18, wherein the first diameter is less than the second diameter.

20. The method of claim 18, further comprising actuating the adjusting mechanism of the steering wheel of the vehicle to position the steering wheel to a default state after the driving segment is completed, thereby adjusting the diameter of at least a portion of the steering wheel to a third diameter between the first diameter and the second diameter.

\* \* \* \* \*